US009671821B2

(12) United States Patent
Choi

(10) Patent No.: US 9,671,821 B2
(45) Date of Patent: Jun. 6, 2017

(54) SYNCHRONIZATION APPARATUS AND METHOD BETWEEN AVN SYSTEM AND DIGITAL CLOCK OF VEHICLE

(71) Applicant: HYUNDAI MOBIS CO., LTD., Seoul (KR)

(72) Inventor: Min Jae Choi, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 169 days.

(21) Appl. No.: 14/484,088

(22) Filed: Sep. 11, 2014

(65) Prior Publication Data

US 2015/0134997 A1    May 14, 2015

(30) Foreign Application Priority Data

Nov. 11, 2013 (KR) ........................ 10-2013-0136479

(51) Int. Cl.
*G06F 1/12* (2006.01)
(52) U.S. Cl.
CPC ..................... *G06F 1/12* (2013.01)
(58) Field of Classification Search
CPC ......................................................... G06F 1/12
See application file for complete search history.

(56) References Cited

U.S. PATENT DOCUMENTS

| 6,091,804 | A * | 7/2000 | Banerjee | ................ | G04G 5/002 |
| | | | | | 375/355 |
| 6,934,868 | B2 * | 8/2005 | Morrison | .................. | G06F 1/14 |
| | | | | | 709/217 |
| 6,952,440 | B1 * | 10/2005 | Underbrink | .......... | H04B 1/7077 |
| | | | | | 375/150 |
| 6,977,879 | B1 * | 12/2005 | Hamada | ................ | G11B 20/10 |
| | | | | | 369/53.34 |
| 7,149,152 | B1 * | 12/2006 | Chan | ...................... | G03B 21/00 |
| | | | | | 368/10 |
| 7,318,166 | B2 * | 1/2008 | Sohda | ....................... | G06F 1/12 |
| | | | | | 370/503 |
| 2003/0117997 | A1 * | 6/2003 | Kim | ................. | H04W 56/0045 |
| | | | | | 370/350 |
| 2007/0028128 | A1 * | 2/2007 | Ping | ..................... | G06F 1/3203 |
| | | | | | 713/320 |
| 2009/0006882 | A1 * | 1/2009 | Manapragada | ........... | H04L 7/08 |
| | | | | | 713/600 |
| 2010/0165189 | A1 * | 7/2010 | Bae | ....................... | G09G 5/006 |
| | | | | | 348/441 |

(Continued)

FOREIGN PATENT DOCUMENTS

KR    10-0941195 B1    2/2010

*Primary Examiner* — Thomas Lee
*Assistant Examiner* — Mohammad A Rahman
(74) *Attorney, Agent, or Firm* — Knobbe Martens Olson & Bear LLP

(57) ABSTRACT

A synchronization apparatus between an AVN system and a digital clock of a vehicle may include: a clock driving unit configured to transmit a clock information signal; a microcomputer configured to analyze the clock information signal when the clock information signal is received from the clock driving unit, update clock information according to the analysis result, and transmit the updated clock information to an external clock module; and the external clock module configured to display the clock information transmitted from the microcomputer.

4 Claims, 2 Drawing Sheets

(56) References Cited

U.S. PATENT DOCUMENTS

| | | | | |
|---|---|---|---|---|
| 2011/0016343 A1* | 1/2011 | Hoch | .................... | H04J 3/0644 |
| | | | | 713/400 |
| 2012/0133554 A1* | 5/2012 | Bromley | ............... | G01S 5/0018 |
| | | | | 342/357.25 |
| 2015/0138015 A1* | 5/2015 | Ishigami | ................ | G01C 21/28 |
| | | | | 342/357.61 |

* cited by examiner

SYNCHRONIZATION APPARATUS AND METHOD BETWEEN AVN SYSTEM AND DIGITAL CLOCK OF VEHICLE

CROSS-REFERENCES TO RELATED APPLICATIONS

The present application claims priority to Korean application number 10-2013-0136479, filed on Nov. 11, 2013, which is incorporated by reference in its entirety.

BACKGROUND

The present disclosure relates to a synchronization apparatus and method between an AVN (Audio-Video-Navigation) system and a digital clock of a vehicle, and more particularly, to a synchronization apparatus and method between an AVN system and a digital clock of a vehicle, which is capable of preventing a malfunction during time synchronization between the AVN system and the digital clock of the vehicle, thereby improving the precision of the digital clock.

In general, a digital clock is installed on an instrument panel inside a vehicle or at the front of the vehicle ceiling such that a driver easily checks the time during operation.

Furthermore, a multimedia device such as an AVN system is built or mounted in the vehicle, and provides an audio, video, or navigation service.

In addition, the multimedia device such as an AVN system provides the current time information to the driver, using the digital clock.

The related art is disclosed in Korean Patent No. 10-0941195 published on Feb. 10, 2010, and entitled "Vehicle multimedia terminal for displaying time information in interconnection with GPS"

SUMMARY

Embodiments of the present invention are directed to a synchronization apparatus and method between an AVN system and a digital clock of a vehicle, which is capable of substantially preventing a malfunction which may be caused by a system load or transmission delay during time synchronization between the AVN system and the digital clock of the vehicle, thereby improving the precision of the digital clock.

In one embodiment, a synchronization apparatus between an AVN system and a digital clock of a vehicle may include: a clock driving unit configured to transmit a clock information signal; a microcomputer configured to analyze the clock information signal when the clock information signal is received from the clock driving unit, update clock information according to the analysis result, and transmit the updated clock information to an external clock module; and the external clock module configured to display the clock information transmitted from the microcomputer.

When the analysis result for the clock information signal indicates that mode switching did not occur, the microcomputer may determine whether there exists a transmission error of a previously transmission clock information signal. When the transmission error does not exist, the microcomputer may determine whether the clock information signal satisfies a preset comparison condition. When the clock information signal satisfies the comparison condition, the microcomputer may update the clock information.

When the analysis result for the clock information signal indicates that mode switching did not occur, the microcomputer may update the clock information according to the received clock information signal, in case where the transmission error exists in the previously transmitted clock information signal.

When the clock information signal does not satisfy the comparison condition, the microcomputer may count errors. When the error count exceeds a predetermined count, the microcomputer may reset the clock driving unit.

The comparison condition may indicate whether a time difference between the received clock information signal and the previously transmitted clock information signal coincides with a preset period at which the microcomputer updates the clock information and transmits the updated clock information to the external clock module, within a predetermined error range.

When no clock information signal is received from the clock driving unit, the microcomputer may count errors. When the error count exceeds a predetermined count, the microcomputer may reset the clock driving unit.

In another embodiment, a synchronization method between an AVN system and a digital clock of a vehicle may include: analyzing, by a microcomputer, a clock information signal, when the clock information signal is received from a clock driving unit; updating, by the microcomputer, clock information according to the analysis result for the clock information signal; and transmitting, by the microcomputer, the updated clock information to an external clock module.

The updating of the clock information may include: determining whether there exists a transmission error of a previously transmitted clock information signal, when the analysis result for the clock information signal indicates that mode switching did not occur; determining whether the clock information signal satisfies a preset comparison condition, when the transmission error does not exist; and updating the clock information when the clock information signal satisfies the comparison condition.

The updating of the clock information may further include updating the clock information according to the received clock information signal, when the transmission error exists in the previously transmitted clock information signal.

The updating of the clock information may further include: counting errors when the clock information signal does not satisfy the comparison condition; and resetting the clock driving unit when the error count exceeds a predetermined count.

The comparison condition may indicate whether a time difference between the received clock information signal and the previously transmitted clock information signal coincides with a preset period at which the microcomputer updates the clock information and transmits the updated clock information to the external clock module, within a predetermined error range.

The synchronization method may further include: counting errors when the clock information signal is not received from the clock driving unit; and resetting the clock driving unit when the error count exceeds a predetermined count.

In accordance with the embodiments of the present invention, the synchronization apparatus and method may substantially prevent a malfunction which may be caused by a system load or transmission delay during time synchronization between the AVN system and the digital clock of the vehicle, thereby improving the precision of the digital clock.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

An AVN system synchronizes the time information of the digital clock mounted in the instrument panel in real time, while periodically exchanging CAN communications with an application including a clock-related function through a microcomputer of a head unit.

However, a typical synchronization method between the AVN system and the digital clock may not normally transmit data for an unexpected reason such as a system load, or the time of the digital clock may not be accurately displayed for various reasons such as a previous time data transmission error and transmission delay caused by an periodic event signal.

Figure 1:
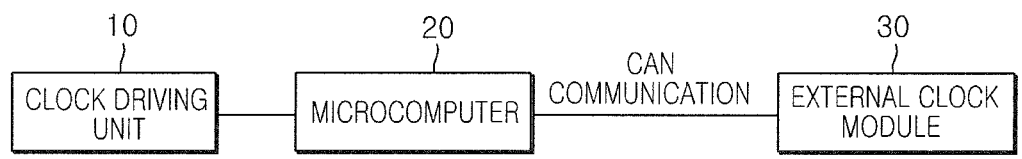
FIG. 1 is a block diagram of a synchronization apparatus between an AVN system and a digital clock of a vehicle in accordance with an embodiment of the present invention.

FIG. 1 is a block diagram of a synchronization apparatus between an AVN system and a digital clock of a vehicle in accordance with an embodiment of the present invention.

As illustrated in FIG. 1, the synchronization apparatus between an AVN system and a digital clock of a vehicle in accordance with the embodiment of the present invention includes a clock driving unit 10, a microcomputer 20, and an external clock module 30.

The clock driving unit 10 is an application including a clock-related function in the AVN system, and transmits a clock information signal to the microcomputer 20 of a head unit.

At this time, the clock information signal may include time format information and time setting information. The time format information may include hour/minute/second and AM/PM information, and the timing setting information may indicate a user mode or GPS mode.

When the clock information signal is received from the clock driving unit 10, the microcomputer 20 may analyze the received clock information signal, update the clock information according to the analysis result, and transmit the updated clock information to the external clock module 30.

When the clock information signal is not received from the clock driving unit 10, the microcomputer 20 may count errors. When the error count exceeds a predetermined count, the microcomputer 20 may reset the clock driving unit 10. The predetermined count may be set to three times in a row.

Furthermore, the microcomputer 20 may transmit the updated clock information to the external clock module 30 at a preset period through CAN communication.

At this time, the preset period may be set to one minute, and the updated clock information may be transmitted at 30 seconds of each minute.

More specifically, when the analysis result for the clock information signal indicates that mode switching did not occur, the microcomputer 20 may determine whether there exists a transmission error of the previously transmitted clock information signal. When the transmission error exists, the microcomputer 20 may update the time information by reflecting the received clock information signal. On the other hand, when no transmission error exists, the microcomputer 20 may determine whether a comparison condition of the clock information signal is satisfied. When the comparison condition is satisfied, the microcomputer 20 may update the clock information.

The comparison condition may indicate whether a time difference between the received clock information signal and the previously transmitted clock information signal coincides with the preset period at which the microcomputer 20 updates the clock information and transmits the updated clock information to the external clock module 30, within a predetermined error range. For example, when the preset period is one minute and the minute value of the clock information signal received from the clock driving unit 10 coincides with the minute value of the previously transmitted clock information signal within the error range of one minute, the microcomputer 20 may determine that the comparison condition of the clock information signal is satisfied.

When the comparison condition is not satisfied, the microcomputer 20 may count errors. When the error count exceeds the predetermined count which is set to three times in a row, the microcomputer 20 may reset the clock driving unit 10.

When the analysis result for the clock information signal indicates that mode switching occurred, the microcomputer 20 may ignore the received clock information signal, and display the time information thereof on the external clock module 30.

At this time, the mode switching condition may include various mode switching events which may occur while the mode is switched between the user mode and the GPS mode. The mode switching events may include an event in which a user changes the time in the user mode, an event in which GPS signals start to be normally received, an event in which time shift occurs, and an even in which the time format is changed. In this case, the microcomputer 20 may ignore the clock information signal received from the clock driving unit 10, and display the clock information thereof on the external clock module 30.

The external clock module 30 may display the time information transmitted from the microcomputer 20.

At this time, the external clock module 30 may include a digital clock mounted on the instrument panel (not illustrated) inside the vehicle or at the front of the vehicle ceiling.

As described above, the synchronization apparatus between an AVN system and a digital clock of a vehicle in accordance with the embodiment of the present invention may substantially prevent a malfunction caused by a system load or transmission delay during the time synchronization between the AVN system and the digital clock of the vehicle. Thus, the precision of the digital clock may be improved to accurately display the time.

Figure 2:
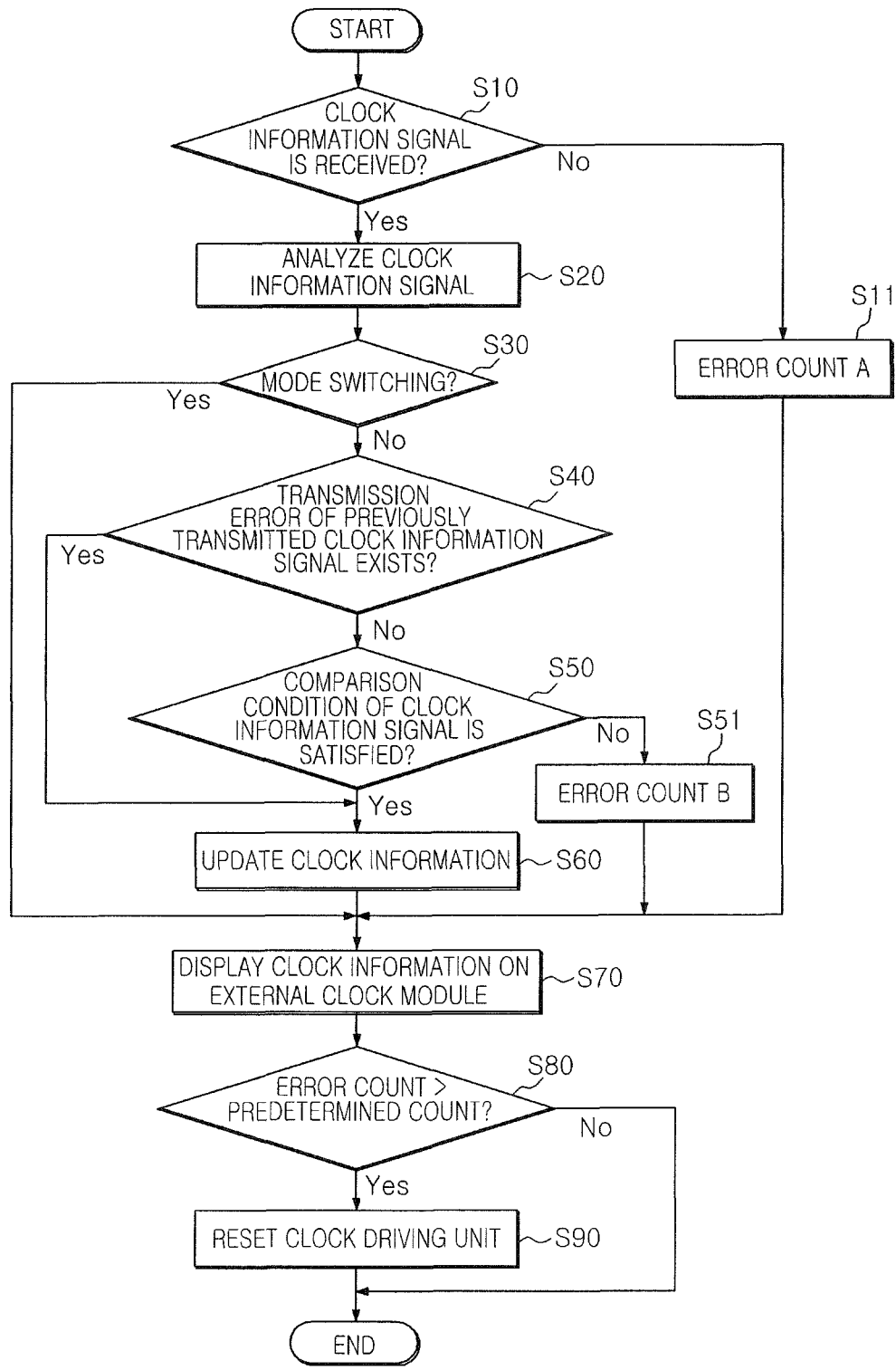
FIG. 2 is a flowchart illustrating a synchronization method between an AVN system and a digital clock of a vehicle in accordance with an embodiment of the present invention.

FIG. 2 is a flowchart illustrating a synchronization method between an AVN system and a digital clock of a vehicle in accordance with an embodiment of the present invention. Referring to FIG. 2, the synchronization method in accordance with the embodiment of the present invention will be described in detail.

First, the microcomputer 20 may determine whether a clock information signal is received from the clock driving unit 10, at step S10.

At this time, the clock information signal may include time format information and time setting information. The time format information may include hour/minute/second and AM/PM information, and the timing setting information may indicate a user mode or GPS mode.

When it is determined at step S10 that the clock information signal is not received from the clock driving unit 10, the microcomputer 20 may count errors at step S11. When the error count A exceeds a predetermined count at step S80, the microcomputer 20 may reset the clock driving unit 10 at step S90. The predetermined count may be set to three times in a row.

When the clock information signal is received, the microcomputer 20 may analyze the received clock information signal at step S20.

At this time, the microcomputer 20 may analyze the clock information signal to determine whether mode switching occurred, at step S30.

When mode switching occurred, the microcomputer 20 may ignore the received clock information signal, and display the clock information thereof on the external clock module 30.

At this time, the mode switching condition may include various mode switching events which may occur while the mode is switched between the user mode and the GPS mode. The mode switching events may include an event in which a user changes the time in the user mode, an event in which GPS signals start to be normally received, an event in which time shift occurs, and an even in which the time format is changed. In this case, the microcomputer 20 may ignore the clock information signal received from the clock driving unit 10, and display the clock information thereof on the external clock module 30.

However, when mode switching did not occur, the microcomputer 20 may determine whether there exists a transmission error of the previously transmitted clock information signal, at step S40.

When it is determined at step S40 that no transmission error exists, the microcomputer 20 may determine whether a comparison condition of the clock information signal is satisfied, at step S50. When the comparison condition is satisfied, the microcomputer 20 may update the clock information by reflecting the received clock information signal, at step S60. The comparison condition may indicate whether a time difference between the received clock information signal and the previously transmitted clock information signal coincides with the preset period at which the microcomputer 20 updates the clock information and transmits the updated clock information to the external clock module 30, within a predetermined error range. For example, when the preset period is one minute and the minute value of the clock information signal received from the clock driving unit 10 coincides with the minute value of the previously transmitted clock information signal within the error range of one minute, the microcomputer 20 may determine that the comparison condition of the clock information signal is satisfied.

When it is determined at step S40 that there exists a transmission error, the microcomputer 20 may not determine the comparison condition, but update the clock information by reflecting the received clock information signal, at step S60.

Then, the microcomputer 20 may transmit the updated clock information to the external clock module 30, and the external clock module 30 may display the clock information transmitted from the microcomputer 20 at step S70.

At this time, the microcomputer 20 may transmit the updated clock information to the external clock module 30 through CAN communication at the preset period. The preset period may be set to one minute, and the updated clock information may be transmitted at 30 seconds of each minute.

When it is determined at step S50 that the comparison condition is not satisfied, the microcomputer 20 may count errors at step S51. When the error count B exceeds a predetermined count at step S80, the microcomputer 20 may reset the clock driving unit 10 at step S90. The predetermined count may be set to three times in a row.

As described above, the synchronization method between n AVN system and a digital clock of a vehicle in accordance with the embodiment of the present invention may substantially prevent a malfunction caused by a system load or transmission delay during the time synchronization between the AVN system and the digital clock of the vehicle. Thus, the precision of the digital clock may be improved to accurately display the time.

Although embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An electronic apparatus of a vehicle comprising a clock for displaying time, the electronic apparatus comprising:
   an audio-video-navigation (AVN) system comprising a display, the AVN system being configured to maintain a current time of the AVN system, wherein the AVN system is configured to periodically issue an AVN clock signal that indicates the current time maintained in the AVN system and further indicates a time setting mode selected from the group consisting of a user mode and a GPS mode;
   a microcomputer external to the AVN system and electrically interposed between the AVN system and the clock of the vehicle, wherein the microcomputer is configured:
   to maintain its own current time as separate from the AVN system's current time,
   to periodically receive the AVN clock signal indicative of the current time of the AVN system,
   to perform an analysis of each received AVN clock signal for determining whether the time setting mode has been switched,
   following receipt of each AVN clock signal, to generate and transmit a synchronization clock signal to the clock of the vehicle, for clock synchronization,
   to count errors when the AVN clock signal is not received, and
   to reset a clock driving unit of the AVN system when the number of errors exceeds a predetermined count,
   wherein in generating the synchronization clock signal following the receipt of each AVN clock signal, the microcomputer is configured to include the current time from the received AVN clock signal when the analysis determines that the time setting mode has not been switched, whereas the microcomputer is configured to include its own current time rather than the current time from the received AVN clock signal when the analysis determines that the time setting mode has been switched.

2. The apparatus of claim 1, wherein the microcomputer is further configured to determine whether there exists a transmission error of the AVN clock signal.

3. A method for synchronizing current time between an audio-video-navigation (AVN) system and a clock of a vehicle, the method comprising:
- maintaining, by a microprocessor, a current time as separate from the AVN system's current time;
- periodically receiving, by the microprocessor, an AVN clock signal from the AVN system, wherein the AVN clock signal indicates current time maintained in the AVN system and further indicates a time setting mode selected from the group consisting of a user mode and a GPS mode;
- performing, by the microprocessor, an analysis of each received AVN clock signal for determining whether the time setting mode has been switched;
- subsequent to receipt of each AVN clock signal, by the microprocessor, generating and transmitting a synchronization clock signal to the clock of the vehicle for clock synchronization;
- counting errors when the AVN clock signal is not received from the AVN system; and
- resetting a clock driving unit of the AVN system when the number of errors exceeds a predetermined count,
- wherein in generating the synchronization clock signal following the receipt of each AVN clock signal, the microcomputer includes the current time from the received AVN clock signal when the analysis determines that the time setting mode has not been switched, whereas the microcomputer includes its own current time rather than the current time from the received AVN clock signal when the analysis determines that the time setting mode has been switched.

4. The method of claim 3, further comprising:
determining whether there exists a transmission error of the AVN clock signal.

* * * * *